United States Patent
Carter, Jr. et al.

[15] 3,674,765

[45] July 4, 1972

[54] PROCESS FOR POLYMERIZING ALPHA-OLEFINS

[72] Inventors: Edward H. Carter, Jr.; Vernon K. Park; Horst K. Seeger, all of Longview, Tex.

[73] Assignee: Eastman Kodak Company, Rochester, N.J.

[22] Filed: Nov. 20, 1970

[21] Appl. No.: 91,592

[52] U.S. Cl............260/88.2, 252/429 A, 252/429 C, 260/55.3, 260/93.7, 260/94.9 B, 260/94.9 E, 260/878, 260/879, 260/886
[51] Int. Cl...........................C08f 1/56, C08f 3/10
[58] Field of Search............23/87 T; 252/429 C, 441; 260/85.3, 84.1, 88.2, 93.7, 94.9 E

[56] References Cited

UNITED STATES PATENTS

| | | | |
|---|---|---|---|
| 3,304,295 | 2/1967 | Hagemeyer et al. | 260/93.7 |
| 3,304,292 | 2/1967 | Hagemeyer et al. | 260/93.7 |
| 3,201,192 | 8/1965 | Siggel et al. | 260/94.9 |

*Primary Examiner*—Joseph L. Schofer
*Assistant Examiner*—Edward J. Smith
*Attorney*—Clyde L. Tootle and Cecil D. Quillen, Jr.

[57] ABSTRACT

This invention relates to an improved catalyst composition, method of making same, and a process for polymerizing α-olefins using the catalyst composition. A transition metal halide catalyst, such as titanium chloride, wherein said transition metal has a valance at least one less than maximum, is pretreated with free lithium metal at elevated temperatures. The treated transition metal halide is then combined with a co-catalyst, such as lithium aluminum hydride, to prepare the catalyst mixture which can then be utilized to polymerize α-monoolefins.

7 Claims, No Drawings

PROCESS FOR POLYMERIZING ALPHA-OLEFINS

This invention relates to a catalyst composition and method of making same wherein said catalyst composition is useful in the polymerization of α-olefins. The invention is also concerned with a polymerization process utilizing said catalyst composition in the preparation of homopolymers and copolymers of α-olefins, including block and graft copolymers of propylene with ethylene, butene-1, hexene-1, styrene, isoprene, and the like.

It is well known that in the catalytic polymerization of α-olefins, it is possible to produce polymers including both copolymers and homopolymers having widely different properties and physical characteristics depending, to a large extent, on the catalyst system and the process conditions. Much of the work in this field has been directed to the development of catalyst and catalytic processes that are capable of forming highly crystalline poly-α-olefins, i.e., those having crystallinities of at least 70 percent, since it has been shown that these highly crystalline polymers have greatly improved properties over the amorphous poly-α-olefins. For example, amorphous polypropylene that has been formed as a solid by some of the methods known in the art has a melting point of only 80° C. and a density of 0.85 while solid, highly crystalline polypropylene has a melting point of at least 165° C. and a density of 0.92. Similarly, crystalline polybutene-1 has a melting point of 120° C. and a density of 0.91, whereas the amorphous polybutene-1 has a softening point of about 60° C. and a density of 0.87. The same increase in melting point is observed with other α-olefins in solid polymeric form including both the straight and branched chain α-monoolefins. Moreover, the same increase in density and melting point is also observed with α-olefins in solid copolymeric form including both the straight and branched chain α-monoolefins copolymerized with other straight and branched chain α-monoolefins. It is apparent, therefore, that polymerization processes and catalyst that will form highly crystalline poly-α-olefins, i.e., those having crystallinities of at least 70 percent, are of considerable importance in the art.

A number of catalytic polymerization processes have been proposed for preparing solid highly crystalline poly-α-olefins. The present invention concerns two general classes of the polymerization processes. One class is the so-called low temperature slurry process. An example of the slurry process is the polymerization of ethylene and higher α-olefins such as propylene and butene-1 to highly crystalline polymers and copolymers in the presence of inert diluents at a temperature of about 100° C. or below and at relatively low pressures. Catalyst mixtures that have been employed in the so-called slurry processes comprise an aluminum-based catalyst component, for example, an aluminum alkyl, a dialkyl aluminum halide, and another component, for example, a transition metal halide. However, when catalyst mixtures of these types are used at temperatures above 100° C., the transition element halide is rapidly reduced and an inactive catalyst results. These prior art catalyst mixtures, therefore, generally cannot be used for polymerization at elevated temperatures and hence are useful primarily in the so-called low temperature slurry polymerization processes.

A second general class of catalytic polymerization process useful in the preparation of solid highly crystalline poly-α-olefins is the so-called high temperature polymerization process. An example of this type of process is the polymerization of ethylene and higher α-olefins, such as propylene and butene-1 to highly crystalline polymers and copolymers in the presence of inert solvents at a temperature of 130° C. or higher and at a pressure in the range of about atmospheric to about 2,000 atmospheres. Catalyst mixtures that have been employed in these high temperature processes comprise a lithium-based catalyst component, for example, lithium metal, lithium aluminum hydride, lithium dialuminum heptahydride, or the organopolylithium aluminum compound obtained from the reaction of lithium hydride or a lithium alkyl with an aluminum alkyl or alkyl aluminum hydride, or mixtures of these compounds, and another catalyst component, for example, a transition element halide.

The invention embodied in the instant application is useful in both the high temperature polymerization process and the low temperature slurry polymerization process referred to above. The instant invention results in both an improved low temperature slurry process and an improved high temperature process whereby the crystallinity and the inherent viscosity (I.V.) of the resultant polyolefin product are significantly greater than the crystallinity and I.V. obtainable in poly-α-olefins prepared according to the known high temperature processes and low temperature slurry processes described above. The instant invention is especially effective in providing an improved high temperature polymerization process.

Another significant advantage of the present invention is the discovery that the polymer properties of poly-α-olefins prepared using catalyst mixtures of the instant invention possess properties, such as crystallinity and I.V., which do not vary appreciably with the amount of catalyst employed. This permits the use of smaller amounts of costly catalyst components such as lithium aluminum hydride, alkyl aluminum sesquihalide, etc., which, of course, is a significant economic advantage. Moreover, the lower concentration of costly catalyst component utilized, the less filtration of the resultant polymer mixture is necessary in order to obtain products with ash contents low enough to be satisfactory for most commercial uses.

Still another significant advantage of the present invention is the discovery that polypropylene can regularly be obtained which possesses approximately a 5–10 percent increase in crystallinity (hexane index) and approximately a 0.3–0.7 I.V. unit increase over a similar prior art process run at the same polymerization temperature.

Another significant contribution to the art realized by the present invention is the development of a catalyst mixture that is effective at even higher temperatures than are generally now used in the aforesaid high temperature solution processes and which is capable of yielding poly-α-olefins having crystallinities of at least 70 percent.

It is accordingly an object of this invention to provide a novel process for the polymerization of α-olefins to high molecular weight polymers and particularly to solid, high molecular weight polymers having very high degrees of crystallinity, i.e., crystallinities of at least 70 percent.

Another object of this invention is to provide a novel catalyst mixture for the polymerization of α-olefins to high molecular weight, highly crystalline polymers at elevated temperatures.

Another object of this invention is to provide a novel process for preparing the aforesaid improved catalytic mixtures which, unlike related mixtures, is highly effective for polymerizing α-olefins to solid polymer and which possesses an unusual degree of stereospecificity whereby objectionable formation of low molecular weight polymers that are oily or greasy in nature is avoided and whereby the formation of amorphous solid polymer is also largely obviated.

Another object of this invention is to provide a novel α-olefin polymerization catalyst mixture that employs a catalytic mixture composed of two components that are very specific in nature wherein one of said components has been pre-treated with lithium metal thereby resulting in an improved catalytic mixture highly effective in the preparation of highly crystalline poly-α-olefins at elevated temperatures.

Another object of this invention is to provide a novel α-olefin polymerization mixture useful in both the low temperature slurry polymerization processes and especially effective in the high temperature solution polymerization processes.

Another object of this invention is to facilitate the commercial production of the very useful highly crystalline solid poly-α-olefins whereby hydrocarbon polymers of very high softening points, high tensile characteristics, good moldability, improved stiffness and film forming properties are readily obtained.

Other objects will be apparent from the description and claims which follow.

In accordance with this invention, applicants have discovered a catalyst composition for the polymerization of α-olefins to solid, high molecular weight, highly crystalline polymers comprising a mixture of A and B, wherein prior to admixture of A and B, component B and free lithium metal are contacted in an inert organic solvent at a temperature of at least 180° C. for a period of at least 1 hour; said component A is a member selected from the group consisting of free lithium metal, lithium aluminum hydride, lithium dialuminum heptahydride, organometallic compounds of the formulas $AlR_3$, $R_2AlH$, $R_2AlX$, and the organopolylithium aluminum compound of the reaction of a member selected from the group consisting of lithium hydride and LiR with a member selected from the group consisting of $AlR_3$ and $R_2AlH$, wherein R is a hydrocarbon radical selected from the group consisting of acyclic alkyl radicals which contain one to 12 carbon atoms, cyclopentyl radicals, cyclohexyl radicals, and phenyl radicals; Al is aluminum, Li is lithium, H is hydrogen, and X is a haolgen selected from the group consisting of chlorine, bromine, and iodine; said component B is a transition metal halide, the transition metal of which is selected from the group consisting of titanium, vanadium, chromium, molybdenum, zirconium, and tungsten in which the valence of the transition metal is at least one less than maximum, the preferred being titanium trichloride with the alpha form being the most preferred. The catalyst composition of the instant invention is extremely effective for polymerizing ethylene, propylene and higher α-olefins, and particularly the straight and branched chain aliphatic α-monoolefins containing up to 10 carbon atoms, to solid, high molecular weight, highly crystalline polymers in excellent yield by commercially feasible methods. The higher α-olefins suitable for use in the practice of this invention include, therefore, propylene, butene-1, pentene-1, hexene-1, heptene-1, octene-1, decene-1, dodecene-1, 3-methyl-1-butene, 4-methyl-1-butene, 4-methyl-1-pentene, 4-methyl-1-hexene, 5-methyl-1-hexene, 4,4-dimethyl-1-pentene and similar α-olefins containing at least three carbon atoms. This invention is also extremely effective in polymerizing propylene and other higher α-monoolefins with ethylene, butene-1, hexene-1, styrene, isoprene, acetylene, and the like comonomers to copolymers, including random, graft and block copolymers.

As already indicated, one component of the improved catalyst mixture of the present invention is a transition metal halide which has been pretreated with lithium metal. Pretreating the transition metal halide component with lithium metal is readily accomplished merely by contacting together the halide component and the lithium metal at an elevated temperature of at least about 180° C., preferably in the temperature range of from about 220° to 250° C., for a period of time sufficient to result in an improved transition metal halide catalyst component as evidenced by an effective increase in the crystallinity and inherent viscosity of a polyolefin prepared with a catalyst mixture containing said improved transition metal halide component. Any convenient means suitable for contacting the transition metal halide and the free lithium metal at elevated temperature can be utilized according to the present invention. Generally, it has been found convenient to contact the transition metal halide component and the free lithium metal in an inert organic liquid solvent, for example, odorless mineral spirits or mineral oil. The particular solvent selected should be one which has a boiling point above the elevated temperature utilized to contact the lithium metal and transition metal halide. It has also been found through experiments and tests of the instant invention that it is desirable to contact the transition metal halide and the free lithium metal at an elevated temperature for a period of at least 1 hour, preferably for a period of about 1 to about 12 hours. Generally no further significant improvement in the transition metal catalyst is obtained after a contact time of about 48 hours. Of course, the time of pretreatment will, in part, depend on the particular temperature employed and the particular transition metal halide utilized; however, although shorter periods of pretreatment may be used in certain situations, a period of at least 1 hour is normally desirable to result in an improved transition metal halide catalyst component.

In pretreating the transition metal halide component employed in the catalyst mixture of this invention, a molar ratio of from about 1:1 to about 1:10 of lithium metal to transition metal halide is useful, and preferably a molar ratio of lithium metal to transition metal halide within the range of from about 1:5 to about 1:2.5 is desirable.

Contacting the free lithium metal and the transition metal halide component can be carried out in any conventional equipment such as stirred glass flasks, stirred steel autoclaves, and the like depending on the particular solvent and temperature used. After treatment of the transition metal halide component, component B as defined above, can be combined with component A, as defined above, to form the catalyst composition of the present invention. The treated transition metal halide component can be combined with said component A by any suitable means. For example, said component A can be admixed into a slurry of the lithium treated transition metal halide component, or said lithium treated transition metal halide can first be filtered, washed, dried and combined as a solid residue with said component A to form the catalyst composition of the present invention. An effective catalyst composition is obtained according to the present invention when a molar ratio of said component A to the lithium treated transition metal halide component within the range of from about 0.1:1 to about 1.5:1 is utilized, the preferred molar ratio being within the range of from about 0.2:1 to about 0.8:1 moles of component A per mole of the lithium treated transition metal halide component. According to a preferred embodiment of the present invention, a third catalyst component may be combined with the above-described two component catalyst composition in order to improve the resultant crystallinity of the polymer and reduce the amount of soluble halides in a polymerization process employing the catalyst composition of the instant invention. Preferably, the third catalyst component is selected from the group consisting of the fluorides of the alkali metals and magnesium oxide. A particularly preferred third component is sodium fluoride.

The catalyst composition described hereinabove is particularly effective at elevated temperatures. Thus, a polymerization reaction employing said catalyst composition can be effectively carried out at temperatures in the range of about 130° to about 300° C., and preferably at temperature in the range of from about 150° to about 250° C. At these high temperatures the catalyst composition is employed in concentrations of 0.01 to about 5 percent by weight based on the α-olefins(s) being polymerized, with preferred catalyst concentrations being in the range of from about 0.075 to about 1.0 percent by weight. As will become apparent from the data presented hereinafter, a significant feature of the catalyst composition of the present invention is the fact that the properties of the polymer obtained from a polymerization process using the catalyst composition of the present invention, for example, crystallinity and inherent viscosity, do not vary appreciably with the amount of catalyst concentration utilized. This permits the use of less catalyst composition which, of course, is a definite economic advantage. This feature of the present invention should be contrasted with other known high temperature olefin catalyst compositions which generally result in a polymer whose properties of crystallinity and inherent viscosity are clearly dependent on the concentration of catalyst composition utilized. Although lower catalyst concentrations than those noted above can be employed, generally the concentration of the catalyst employed will depend upon the desired method of operation; for example, low catalyst concentrations would be used where high polymer to catalyst yields are desired. On the other hand, high catalyst concentrations are employed where high polymer yields to reactor space are desired. The polymers formed at the high temperatures employed in accordance with a preferred embodiment of the present invention are highly crystalline, i.e., the polymers exhibit crystallinities in excess of 70, 80 or even 90 percent. The crystallinities of the products can be determined by extraction techniques that are well known in the art. For example, the crystallinity of polypropylene is determined by refluxing the polymer in hexane, the portion of the solid polymer insoluble in refluxing hexane being the crystalline portion.

A high temperature polymerization process utilizing the catalyst composition of the present invention is generally carried out at pressures in the range of about atmospheric to about 2,000 atmospheres. Usually pressures greater than 15 atmospheres are employed to obtain commercially satisfactory rates. Higher pressures are generally required for the polymerization in the absence of the solvent. In the absence of a solvent, the gas dissolved in the polymer should generally be from 1 to 4 times the weight of the polymer in order to obtain viscosities that can be handled satisfactorily in the reactor stage. Increasing the quantities of dissolved gas lowers the viscosity in the reactor space which allows for better heat transfer and good catalyst distribution. The pressure in the polymerization can be achieved in any desirable manner, the convenient method being to pressure the system with the monomer or co-monomers being polymerized.

The high temperature polymerization reaction can be carried out in the presence or absence of an inert organic liquid vehicle. When the polymerization is carried out in the presence of an inert organic liquid vehicle, this vehicle can be any of the inert organic liquids which contain no combined oxygen and which are free of water, alcohol, ether or other compounds containing oxygen or compounds containing unsaturation. The organic vehicle employed can be aliphatic alkane or cycloalkane such as pentane, hexane, heptane or cyclohexane, or a high molecular weight liquid paraffin or mixture of paraffins which are liquid at the reaction temperature or an aromatic hydrocarbon such as benzene, toluene, xylene, or the like or a halogenated aromatic compound such as chlorobenzene. A petroleum fraction of suitable boiling range, such as odorless mineral spirits (a sulfuric acid washed paraffinic hydrocarbon boiling at 180°–200° C.) will give particularly good results. In addition, good results can be obtained when the polymerization is carried out in the presence of a dense gas such as highly compressed propylene by operating at elevated pressures.

Of course, as noted hereinabove, when component A of the catalyst composition of the present invention is selected from the group consisting of organometallic compounds of the formulas $AlR_3$, $R_2AlH$, and $R_2AlX$ wherein R, Al, H, and X are as defined hereinabove, a low temperature polymerization process, for example, a slurry process operated at a temperature of about 100° C. or less, is utilized to produce a crystalline polymer having an inherent viscosity of at least 2.0.

The following examples of the instant invention are herewith presented to further illustrate in greater detail, but not to limit, said invention. In Examples 1–10, the invention is illustrated by the polymerization of propylene which is, at present, the most readily available of the higher α-olefins and hence is of greatest immediate commercial application. The invention is applicable, however, to any of the other α-olefins, as defined herein, and it is found that large amounts of solid, high molecular weight, highly crystalline polymers are prepared by polymerizing such diverse materials as ethylene, butene-1, pentene-1, 4-methyl-1-hexene, 5-methyl-1-hexene, and 4,4'-dimethyl-1-pentene using the process and catalyst described herein. Example 11 illustrates the invention in the polymerization of ethylene. In Examples 9–10, that aspect of the invention dealing with the preparation of copolymers such as propylene-ethylene block copolymers, commonly called polyallomers, and propylene-butene random copolymers is illustrated.

EXAMPLE 1

A typical treatment of $TiCl_3$ with lithium metal is given below.

a. Pretreatment of $TiCl_3$ with Lithium Metal (0.6:1 Li:Ti)

Into a dry 1-liter, round-bottom, three-neck flask fitted with a stirrer, thermowell, and condensor are added 600 ml. of mineral oil, 30 grams (0.195 mole) of $TiCl_3$, and 5.45 grams of 15 weight percent lithium metal dispersion in mineral oil equivalent to 0.82 gram (0.117 gram atom) of lithium.

The slurry is stirred at 230° C. for 6 hours under a dry nitrogen atmosphere. The slurry, after being cooled to room temperature, is filtered through a coarse glass frit filter in a nitrogen-purged dry box. The $TiCl_3$ is then washed three times with isopentane to remove the mineral oil and then dried in vacuo. The dried, lithium-treated $TiCl_3$ is then used for propylene polymerization experiments. Similar lithium metal pretreatments of $TiCl_3$ is made at mole ratios of lithium to titanium trichloride of 0.2 to 1 and 0.4 to 1.

b. Propylene Polymerizations with Lithium-Treated $TiCl_3$

The lithium-treated $TiCl_3$ prepared above is used in propylene polymerization experiments with $LiAlH_4$ at 150° and 160° C., 1000 psi. propylene in a 2-liter stirred stainless steel autoclave. The polymer from the autoclave is placed in a Waring blendor and washed with isopropanol to remove the catalyst residues and mineral spirits solvent. The fine polymer powder is then washed with acetone one and dried. The powder hexane index is determined by placing 5 grams of the fine powdered polymer into a glass thimble and extracting with n-hexane in a Soxhlet extractor under nitrogen for 6 hours. The hexane index is calculated as the percent polymer non-extracted with hexane.

Table I gives the data of the runs made. For comparison, runs with untreated $TiCl_3$ are also given.

It is to be noted that a more crystalline and higher molecular weight polypropylene is made with the lithium-treated $TiCl_3$ than with the untreated $TiCl_3$. The powder hexane index is improved 6 to 10 percent, and the I.V. is increased 0.3 to 0.8 unit. The improvement in crystallinity and I.V. is more pronounced at the 160° C. polymerization temperature.

TABLE I

[Lithium-treated $TiCl_3$ effect of Li to $TiCl_3$ pretreatment mole ratio]

| Lithium pretreatment ratio Li to $TiCl_3$ | Catalyst weight, g. | | Mole ratio $LiAlH_4$ to $TiCl_3$ | Temp., °C. | Time, hr. | Yield, g. | Powder hexane index | I.V. |
|---|---|---|---|---|---|---|---|---|
| | $LiAlH_4$ | $TiCl_3$ | | | | | | |
| (Untreated) | 0.30 | 1.54 | 0.8:1 | 150 | 2 | 162 | 71 | 2.38 |
| 0.2 | 0.15 | 0.77 | 0.8:1 | 150 | 3 | 118 | 79.2 | 2.58 |
| 0.4 | 0.15 | 0.77 | 0.8:1 | 150 | 3.5 | 182 | 77.6 | 3.01 |
| 0.6 | 0.15 | 0.77 | 0.8:1 | 150 | 3 | 88 | 85.4 | 2.72 |
| (Untreated) | 0.15 | 0.77 | 0.8:1 | 160 | 2 | 127 | 67.4 | 1.68 |
| 0.2 | 0.15 | 0.77 | 0.8:1 | 160 | 15 | 201 | 75.0 | 2.23 |
| 0.4 | 0.12 | 0.63 | 0.8:1 | 160 | 7 | 82 | 80.0 | 2.41 |
| 0.6 | 0.30 | 1.54 | 0.8:1 | 160 | 2 | 74 | 80.8 | 2.59 |

NOTE.—Runs made in 2-liter autoclave: Temperature, 150° C. and 160° C.; pressure, 1,000 p.s.i. propylene; solvent, 1,000 ml. mineral spirits.

EXAMPLE 2

This example gives a series of runs made with lithium-treated $TiCl_3$ used with $LiAl_2H_7$ as co-catalyst. The lithium pretreatment is carried out as follows:

Into a dry 1-liter stainless steel Parr autoclave is added 750 ml. of mineral spirits, 60 grams (0.39 mole) of titanium trichloride and 5.45 grams of 15 weight percent lithium dispersion in mineral oil equivalent to 0.82 gram (0.12 gram atom) of lithium. The autoclave is sealed, purged with nitrogen, and heated to 240° C. with stirring. The pressure developed from the mineral spirits at 240° C. is 70 psig. The slurry is stirred 12 hours at 240° C. under a pressure of 70 psig. and then cooled to ambient temperature.

The $TiCl_3$ slurry is then filtered in a nitrogen dry box, washed with isopentane three times and dried in vacuo.

Propylene polymerization experiments were made with lithium-treated $TiCl_3$ in combination with $LiAl_2H_7$. Data on these runs are given in Table II.

The improvement in crystallinity (powder hexane index) and I.V. is to be noted with the lithium-treated $TiCl_3$ even at only 0.1 to 1 $LiAl_2H_7$ to $TiCl_3$ mole ratio. The lithium pretreatment produces a more stereospecific catalyst.

TABLE II

[Lithium-treated $TiCl_3$ with $LiAl_2H_7$ as co-catalyst]

| Lithium pre-treatment ratio Li to $TiCl_3$ | Catalyst weight, g. | | Mole ratio $LiAl_2H_7$ to $TiCl_3$ | Time, hr. | Yield, g. | Powder hexane index | I.V. |
|---|---|---|---|---|---|---|---|
| | $LiAl_2H_7$ | $TiCl_3$ | | | | | |
| (Untreated) | 0.034 | 0.75 | 0.1:1 | 6 | 135 | 73.6 | 1.92 |
| 0.2 | 0.034 | 0.75 | 0.1:1 | 6 | 131 | 76.8 | 2.39 |
| 0.4 | 0.034 | 0.75 | 0.1:1 | 6 | 199 | 79.1 | 2.81 |
| 0.6 | 0.034 | 0.75 | 0.1:1 | 6 | 196 | 76.6 | 2.72 |
| 0.3 | 0.080 | 0.24 | 0.4:1 | 6 | 94 | 86.1 | 2.76 |

NOTE.—Runs made in a 2-liter stirred autoclave: Temperature, 150° C.; pressure, 1,000 p.s.i. propylene: solvent, 1,000 ml. mineral spirits.

EXAMPLE 3

This example shows that the polymer I.V. and crystallinity do not vary appreciably with changes in the co-catalyst/catalyst mole ratio, i.e., $LiAlH_4$ to $TiCl_3$, for a given polymerization temperature using $TiCl_3$ treated with lithium metal. This indicates that the $TiCl_3$ so treated is more stereospecific for the polymerization of alpha-olefins.

The $TiCl_3$ used in the experiments is treated as give in Example 2. Table III gives the data of these runs.

TABLE III

[Lithium-treated $TiCl_3$ effect of $LiAlH_4$ to $TiCl_3$ mole ratio]

| Lithium pre-treatment ratio Li to $TiCl_3$ | Catalyst weight, g. | | Mole ratio $LiAlH_4$ to $TiCl_3$ | Activity, g./g./hr. | Powder hexane index | I.V. |
|---|---|---|---|---|---|---|
| | $LiAlH_4$ | $TiCl_3$ | | | | |
| Untreated $TiCl_3$ | 0.10 | 1.0 | 0.4:1 | 35 | 69.2 | 1.75 |
| 0.4 | 0.10 | 1.0 | 0.4:1 | 22 | 77.6 | 2.25 |
| Untreated $TiCl_3$ | 0.15 | 1.0 | 0.6:1 | 40 | 70.2 | 1.80 |
| 0.4 | 0.15 | 1.0 | 0.6:1 | 32 | 78.7 | 2.40 |
| Untreated $TiCl_3$ | 0.20 | 1.0 | 0.8:1 | 31 | 72.2 | 1.95 |
| 0.4 | 0.20 | 1.0 | 0.8:1 | 28 | 80.5 | 2.45 |

NOTE.—Polymerizations are made in a 2-liter stirred autoclave: Temperature, 160° C.; pressure, 1,000 p.s.i. propylene; solvent, 1,000 m. mineral spirits; time, 6 hours.

EXAMPLE 4

A catalyst comprising 20 grams (0.13 mole) of titanium trichloride (pretreated with lithium metal at 0.2 to 1 Li to $TiCl_3$ mole ratio at 240° C. for 6 hours) and 2.5 grams (0.065 mole) of lithium aluminum hydride and 2.7 grams (0.065 mole) of sodium fluoride is charged to an 80-gallon stirred reactor with 30 gallons of mineral spirits. The reactor is heated to 155° C. with stirring and pressured to 400 psig. with propylene. After 12 hours reaction time the polymer solution is then diluted to a solids content of 10 percent, filtered through a plate and frame filter precoated with filter aid, melt concentrated to 80 percent solids, extruded into water and cut into ⅛-inch pellets. A yield of 40 pounds of hexane-extracted polypropylene is obtained. The polymer has an I.V. of 2.6 and a pellet hexane index of 88 percent. The chloride level in the polymer is 5 ppm. and the ash content 0.001 percent.

A similar experiment using regular untreated $TiCl_3$ results in polypropylene having the following properties:

| Pellet hexane index | = 78.5% |
|---|---|
| I.V. | = 2.2 |
| Ash | = 0.010% |
| Chloride | = 25 ppm. |

The reduction in the chloride level is significant with the lithium-treated $TiCl_3$ in combination with the third component sodium fluoride.

EXAMPLE 5

A catalyst comprising 10.5 ml. (1.85 grams, 0.013 mole) of diisobutyl aluminum hydride in n-heptane and 2.0 grams (0.013 mole) of titanium trichloride pretreated with 0.3 gram atom of lithium at 230° C. is charged with 800 ml. cyclohexane to a 2-liter stirred stainless steel autoclave pressured to 300 psi. propylene at 70° C. The reaction is allowed to proceed 4 hours at 70° C. and 300 psi. propylene. The polymer slurry, after being washed with isopropanol and acetone and drying, yields 425 grams of polypropylene having an I.V. of 4.5 and a hexane non-extractable content of 95.3 percent.

This experiment is repeated as above except regular untreated $TiCl_3$ is used. The polypropylene obtained has an I.V. of 2.6 and a hexane non-extractables of 84.2 percent.

This again shows the improved stereospecificity obtained by treatment of the $TiCl_3$ with lithium metal.

EXAMPLE 6

A series of runs are made in a 2-liter stainless steel stirred autoclave to produce crystalline propylene polymers using $LiAlH_4$ in combination with lithium-treated $VCl_3$, $CrCl_3$, and $MoCl_3$. For comparison, runs are also made with regular untreated $VCl_3$, $CrCl_3$, and $MoCl_3$. The transition element chlorides ($MCl_3$) are pretreated with lithium metal dispersion at 0.3 to 1 mole ratio Li to $MCl_3$ at 220° C. for 10 hours. The catalyst charge was 3.0 grams in each run. Each polymerization run is carried out 3 hours. Results are given in Table IV. Polymer made with the lithium-treated transition element halide has improved powder hexane index and I.V.

TABLE IV

[Lithium-treated transition element chlorides]

| Catalyst | Mole Ratio LiAlH₄ to MCl₃ | Polymerization Conditions | | | Activity, g./g./hr. | Powder hexane index | I.V. |
|---|---|---|---|---|---|---|---|
| | | Temp., °C. | Pressure, p.s.i.g. propylene | Solvent | | | |
| LiAlH₄, VCl₃ (Untreated) | 0.8:1 | 160 | 1,000 | Mineral spirits | 38 | 74.5 | 2.1 |
| LiAlH₄, VCl₃ (Li treated) | 0.8:1 | 160 | 1,000 | do | 32 | 78.5 | 2.3 |
| LiAlH₄, CrCl₃ (Untreated) | 1:1 | 165 | 1,200 | Xylene | 25 | 72.1 | 1.4 |
| LiAlH₄, CrCl₃ (Li treated) | 1:1 | 165 | 1,200 | do | 20 | 77.0 | 1.8 |
| LiAlH₄, MoCl₃ (Untreated) | 0.5:1 | 155 | 1,200 | Mineral spirits | 31 | 75.0 | 1.6 |
| LiAlH₄, MoCl₃ (Li treated) | 0.5:1 | 155 | 1,200 | do | 24 | 79.6 | 2.0 |

EXAMPLE 7

This example shows a series of runs comparing lithium-treated $TiCl_3$ with other chemically treated $TiCl_3$ samples in making propylene polymers with $LiAlH_4$ as the co-catalyst in a high temperature solution polymerization.

The runs are carried out in a 2-liter stirred autoclave with 2.0 grams of catalyst in 1,000 ml. of mineral spirits at 1,000 psig. propylene pressure at 150° C. for 2 hours. Table V gives a summary of these experiments.

Only the lithium-treated $TiCl_3$ shows an improvement in the polymer powder hexane index and I.V., i.e., 82–83 percent, 2.6–2.8.

EXAMPLE 9

Propylene-ethylene polyallomers are made by polymerization in a continuous 2-zone reactor system. In the first stirred tubular reaction, mineral spirits solvent, catalyst, and propylene are added. A catalyst comprising 1.7 parts by weight lithium aluminum hydride and 14.3 parts by weight titanium trichloride (pretreated for 10 hours with 0.2 atom of lithium per mole of $TiCl_3$ at 230° C.) slurried in mineral spirits is fed at rates varying from 0.1 to 0.45 pound per hour. Temperature in the first zone is controlled by external cooling and by controlling the rate of feed and temperature of the incoming propylene. The inherent viscosity of the polymer produced is a function of the reaction temperature. Conversions in the first zone are generally controlled at 20–40 percent and are a function of the propylene feed rate and the catalyst concentration employed.

In the second-stage reactor ethylene is fed to give modified propylene containing polymers with superior low temperature brittleness values. Feed rates for ethylene varying from 5 to 50 pounds per hour are typical of those employed.

Polymer solution from the second-stage reactor is passed to a letdown tank where it is diluted with additional solvent, filtered through a precoat filter, melt concentrated to remove the major portion, approximately 85 percent, of the solvent, extruded, and cut into ⅛-inch pellets. The pellets are extracted with hexane at 69° C. for 8-12 hours to remove amorphous polymer and remaining solvent. Polymer-to-catalysts yields are of the order of 500 to 1,500 to 1.

Data from experimental plant runs are given in Table VII.

TABLE V

[Comparison of lithium-treated $TiCl_3$ with other chemical treated $TiCl_3$]

| | Pretreatment of TiCl₃ | | | | | |
|---|---|---|---|---|---|---|
| Agent | Mole ratio agent/TiCl₃ | Conditions | LiAlH₄/TiCl₃ mole ratio | Yield, g. | Powder hexane index | I.V. |
| None | | | 1/1 | 168 | 75.0 | 2.4 |
| Al(i-Pr)₃ | 0.2 | Stirred 12 hrs. at 100° C. in mineral spirits | 1/1 | 152 | 76.0 | 2.5 |
| AlEt₃ | 0.2 | do | 1/1 | 176 | 72.4 | 1.5 |
| Al(n-Pr)₃ | 0.2 | do | 1/1 | 160 | 76.8 | 2.4 |
| Al-i-Bu₂H | 0.4 | do | 1/1 | 139 | 75.3 | 2.6 |
| AlEt₂Cl | 0.4 | do | 1/1 | 104 | 77.0 | 2.2 |
| Na metal | 0.6 | Stirred 12 hrs. at 250° C. in mineral spirits | 1/1 | 72 | 65.6 | 2.2 |
| Li metal | 0.4 | Stirred 12 hrs. at 230° C. in mineral spirits | 0.8/1 | 85 | 82.5 | 2.8 |
| Do | 0.3 | do | 0.8/1 | 158 | 83.7 | 2.6 |

EXAMPLE 8

This example shows a comparison between lithium-based co-catalysts and an aluminum alkyl-type co-catalyst in combination with lithium-treated $TiCl_3$ for the polymerization of propylene.

Two grams of catalyst is added to a 2-liter stainless steel stirred autoclave with 800 ml. of mineral spirits at 1,000 psig. propylene pressure and 160° C. The polymerization runs are carried out 3 hours. Experimental data is given in Table VI.

A higher I.V. and more crystalline polymer is made with the lithium-based co-catalyst, $LiAlH_4$, etc., as compared to $AlEt_3$.

TABLE VI

[Comparison of lithium-based and aluminum based co-catalysts with lithium-treated TiCl₃]

| TiCl₃ Pretreatment | Co-Catalyst | Mole ratio Al/Ti | Yield, g. | Powder hexane index | I.V. |
|---|---|---|---|---|---|
| TiCl₃ stirred 12 hrs. at 240° C. in mineral spirits with lithium at 0.3 to 1. | AlEt₃ | 0.6 | 194 | 67 | 1.40 |
| Do | LiAlH₄ | 0.6 | 178 | 78.7 | 2.40 |
| Do | Solid Hydrocarbon solvent-insoluble product of reaction of 1:1 LiBu:AlEt₃. | 0.3 | 270 | 82.6 | 2.31 |
| Do | Organopolylithium aluminum product of reaction of 1:1 LiBu:AlPr₃. | 0.4 | 210 | 86.5 | 2.52 |

TABLE VII

| | Run No. | |
|---|---|---|
| | PP-1 | PP-2 |
| Propylene fed to first zone, lb/hr | 250 | 350 |
| Catalyst feed, lb/hr | 0.21 | 0.35 |
| 1.7 parts LiAlH₄ | | |
| 14.3 parts TiCl₃ (0.2 Li treated) | | |
| Reactor pressure, psig. | 1000 | 1200 |
| Reactor temperatures, °C. | | |
| First zone | 160 | 165 |
| Second zone | 170 | 175 |
| Ethylene feed to first zone, lb/hr | — | — |
| Ethylene feed to second zone, lb/hr | 5.5 | 10.5 |
| Production rate, lb/hr | 150 | 180 |
| Inherent viscosity | 1.9 | 1.8 |
| Percent ethylene in polymer after | | |

| | | |
|---|---|---|
| hexane extraction | 2.1 | 3.4 |
| Brittleness temperature, °C. | −20 | −32 |

EXAMPLE 10

A catalyst comprising 5 grams (0.13 mole) of LiAlH$_4$ and 25 grams (0.16 mole) of lithium-treated TiCl$_3$ (0.3 atom Li/mole TiCl$_3$ at 240° C. for 5 hours) is charged to an 80-gallon stirred autoclave containing 40 gallons of odorless mineral spirits and pressured to 200 psig. with a 40:60 weight percent mixture of propylene:butene at 100° C. The reaction is allowed to proceed 12 hours at 100° C. and 200 psig. propylene-butene pressure. The polymer solution is washed successively with isobutanol to remove the catalyst residues. The polymer powder is then dried in vacuo. A yield of 60 pounds of propylene-butene copolymer containing 42 percent butene is obtained having an inherent viscosity of 2.6 and brittleness temperature of −30° C. Films made from this polymer are tough and transparent.

EXAMPLE 11

To a 2-liter stainless steel stirred autoclave heated to 180° C., and containing ethylene at 700 psig. pressure is charged 0.34 gram (0.005 mole) of LiAl$_2$H$_7$ and 1.54 gram (0.01 mole) of TiCl$_3$ (pretreated with lithium metal at 0.6/1 Li/TiCl$_3$ mole ratio at 250° C.) with 1,000 ml. mineral spirits. The autoclave is stirred and pressured to 1,000 psig. ethylene. The polymerization is allowed to run 6 hours at 180° C. and 1,000 psig. ethylene. The polymer solution is extruded from the autoclave and washed with isopropanol and acetone. A yield of 360 grams of linear crystalline polyethylene is made having the following properties: melt index of 0.72 and density of 0.9680.

This invention has been described in detail with particular reference to preferred embodiments thereof, but it will be understood that variations and modifications can be effected within the spirit and scope of the invention.

We claim:

1. In a method for increasing the stereospecificity of a catalyst composition for the polymerization of α-olefins to solid, high molecular weight, highly crystalline polymers comprising a mixture of Component A selected from the group consisting of free lithium metal, lithium aluminum hydride, lithium dialuminum heptahydride, organometallic compounds having the formulas AlR$_3$, R$_2$AlX, and organopolylithium aluminum compound prepared by the reaction of a member selected from the group consisting of lithium hydride and LiR with a member selected from the group consisting of AlR$_3$ and R$_2$AlH wherein R is a hydrocarbon radical selected from the group consisting of acyclic alkyl radicals which contain one to 12 carbon atoms, cyclopentyl, cyclohexyl, and phenyl, Al is aluminum, Li is lithium, H is hydrogen, and X is a halogen selected from the group consisting of chlorine, bromine, and iodine; and Component B selected from the group consisting of a halide of a transition metal selected from the group consisting of titanium, vanadium, chromium, molybdenum, zirconium, and tungsten, the valence of the transition metal in said halide being at least one less than maximum; the improvement which comprises contacting said Component B with free lithium metal in a molar ratio of from about 1:1 to about 1:10 of lithium metal to Component B in an inert organic solvent at a temperature of from about 180° to about 250° C. for a period of from about 1 to about 12 hours prior to mixing with said Component A in a molar ratio of Component A to lithium treated Component B of from about 0.1:1 to about 1.5:1.

2. The process for polymerizing an α-monoolefin containing three to 10 carbon atoms to a solid, high molecular weight, highly crystalline polymer which comprises polymerizing said α-monoolefin with the catalyst composition of claim 1.

3. The process of claim 2 wherein said α-monoolefin is propylene.

4. The catalyst composition of claim 1 wherein the transition metal of said transition metal chloride is selected from the group consisting of vanadium, titanium, and chromium.

5. The catalyst composition of claim 4 wherein the transition metal chloride is the alpha form of titanium trichloride.

6. The process for polymerizing an α-monoolefin containing up to 10 carbon atoms with another compound selected from the group consisting of ethylene, propylene, butene-1, hexene-1, styrene, isoprene, and acetylene to solid, high molecular weight, highly crystalline copolymers which comprises contacting a mixture of said α-monoolefin and said other compound, at a temperature in the range of about 150° to about 250° C., and a pressure in the range of about atmospheric to about 2,000 atmospheres, with the catalyst composition of Claim 1 wherein said Component A is selected from the group consisting of free lithium metal, lithium aluminum hydride, lithium dialuminum heptahydride, and organopolylithium aluminum compound prepared by the reaction of a member selected from the group consisting of lithium hydride and LiR with a member selected from the group consisting of AlR$_3$ and R$_2$AlH wherein R is a hydrocarbon radical selected from the group consisting of acyclic alkyl radicals which contain one to 12 carbon atoms, cyclopentyl, cyclohexyl, and phenyl, Al is aluminum, Li is lithium, and H is hydrogen.

7. The process of claim 6 wherein said α-monoolefin is propylene and said other compound is ethylene.

* * * * *